United States Patent
Min (10) Patent No.: US 9,459,704 B2
(45) Date of Patent: Oct. 4, 2016

(54) METHOD AND APPARATUS FOR PROVIDING ONE-HANDED USER INTERFACE IN MOBILE DEVICE HAVING TOUCH SCREEN

(71) Applicant: Samsung Electronics Co., Ltd, Gyeonggi-do (KR)

(72) Inventor: Sunyoung Min, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 297 days.

(21) Appl. No.: 14/024,488

(22) Filed: Sep. 11, 2013

(65) Prior Publication Data

US 2014/0071049 A1    Mar. 13, 2014

(30) Foreign Application Priority Data

Sep. 11, 2012 (KR) .................. 10-2012-0100240

(51) Int. Cl.
G06F 3/033 (2013.01)
G06F 3/041 (2006.01)
G06F 3/0488 (2013.01)

(52) U.S. Cl.
CPC ............. *G06F 3/033* (2013.01); *G06F 3/0414* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 2008/0122796 A1* | 5/2008 | Jobs et al. | 345/173 |
| 2010/0020035 A1* | 1/2010 | Ryu et al. | 345/173 |
| 2011/0267291 A1* | 11/2011 | Choi et al. | 345/173 |
| 2012/0281018 A1* | 11/2012 | Yamamoto | G06F 1/1626 345/634 |
| 2013/0229380 A1* | 9/2013 | Lutz et al. | 345/174 |
| 2013/0318159 A1* | 11/2013 | Earnshaw | H04N 1/00347 709/204 |
| 2013/0328779 A1* | 12/2013 | Butner | G06F 3/0488 345/163 |

* cited by examiner

*Primary Examiner* — Joseph Feild
*Assistant Examiner* — Henok Heyi (57) ABSTRACT

A method provides a user interface in a mobile device having a touch screen. The method includes detecting a touch region from the touch screen, and determining whether the detected touch region satisfies at least one of a first condition of exceeding a predetermined area, a second condition of exceeding a predetermined time, and a third condition of exceeding a predetermined pressure. The method further includes displaying a pointer at a specific location of the touch screen when the detected touch region satisfies at least one of the first, second and third conditions, detecting a movement of the touch region, and moving the pointer in response to the movement of the touch region.

18 Claims, 6 Drawing Sheets

METHOD AND APPARATUS FOR PROVIDING ONE-HANDED USER INTERFACE IN MOBILE DEVICE HAVING TOUCH SCREEN

CROSS-REFERENCE TO RELATED APPLICATION(S) AND CLAIM OF PRIORITY

The present application is related to and claims the benefit under 35 U.S.C. §119(a) of a Korean patent application filed on Sep. 11, 2012 in the Korean Intellectual Property Office and assigned Serial No. 10-2012-0100240, the entire disclosure of which is hereby incorporated by reference.

TECHNICAL FIELD OF THE INVENTION

The present disclosure relates generally to a mobile device having a touch screen and, more particularly, to a method and apparatus for providing a one-handed user interface in a mobile device having a touch screen.

BACKGROUND OF THE INVENTION

With the remarkable growth of related technologies, a great variety of mobile devices, e.g., smart phones or tablet PCs, are increasingly popular due to their high usability and good portability. Particularly, most recent mobile devices have a touch screen that acts as both an input unit and a display unit through a single screen. Such mobile devices having a touch screen not only offer a traditional communication service, but also offer various new functions such as video playback or document creation.

Additionally, according to recent developments in the speed of a mobile network, a video service executable in the mobile device uses advances in image quality and resolution. This leads to an increase in a touch screen size of the mobile device and to a growing tendency for users to prefer a relatively larger size of the touch screen. Contrary to past mobile devices that merely offer a communication service and have a smaller sized touch screen for a one-handed manipulation, current mobile devices that offer various functions commonly have a larger sized touch screen but may sacrifice one-handed manipulability. That is, a large screen size may often cause users some difficulties in manipulating the touch screen with only one hand.

SUMMARY OF THE INVENTION

To address the above-discussed deficiencies of the prior art, it is a primary object to provide a one-handed user interface for a mobile device having a touch screen.

Another aspect of the present disclosure is to provide a user interface that allows a one-hand manipulation by recognizing the area of a touch contact in a mobile device having a touch screen.

Still another aspect of the present disclosure is to provide a user interface that can display a virtual pointer on a touch screen in response to a user's one-hand manipulation and then perform a particular function in response to the user's input action using the displayed pointer.

According to one aspect of the present disclosure, provided is a method for providing a user interface in a mobile device having a touch screen. The method includes detecting a touch region from the touch screen. The method also includes determining whether the detected touch region satisfies at least one of a first condition of exceeding a predetermined area, a second condition of exceeding a predetermined time, and a third condition of exceeding a predetermined pressure. The method further includes displaying a pointer at a specific location of the touch screen when the detected touch region satisfies at least one of the first, second and third conditions. The method still further includes detecting a movement of the touch region, and moving the pointer in response to the movement of the touch region.

According to another aspect of the present disclosure, provided is an apparatus for providing a user interface in a mobile device. The apparatus includes a touch screen configured to display a specific screen and a control unit. The control unit is configured to detect a touch region from the touch screen, determine whether the detected touch region satisfies at least one of a first condition of exceeding a predetermined area, a second condition of exceeding a predetermined time, and a third condition of exceeding a predetermined pressure, control the touch screen to display a pointer at a specific location when the detected touch region satisfies at least one of the first, second and third conditions, detect a movement of the touch region, and move the pointer in response to the movement of the touch region.

According to aspects of this disclosure, in a mobile device having a touch screen, a user interface allows a one-hand manipulation to perform a selected function by using at least one of a touch contact area, a touch contact time, and a touch pressure. Also, this user interface improves user friendliness by displaying a virtual pointer such as a mouse pointer on a touch screen, moving the pointer, and executing a particular object selected by the pointer in response to user's one-hand manipulations. Namely, this disclosure provides a user-friendly, one-hand controllable user interface for a mobile device having a large screen.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Exemplary, non-limiting embodiments of the present disclosure will now be described more fully with reference to the accompanying drawings. This disclosure may, however, be embodied in many different forms and should not be construed as limited to the exemplary embodiments set forth herein. Rather, the disclosed embodiments are provided so that this disclosure will be thorough and complete, and will fully convey the scope of the disclosure to those skilled in the art. The principles and features of this disclosure may be employed in varied and numerous embodiments without departing from the scope of the disclosure.

Furthermore, well known or widely used techniques, elements, structures, and processes may not be described or illustrated in detail to avoid obscuring the essence of the present disclosure. Although the drawings represent exemplary embodiments of the disclosure, the drawings are not necessarily to scale and certain features may be exaggerated or omitted in order to better illustrate and explain the present disclosure.

According to embodiments of this disclosure, provided for a mobile device having a touch screen is a user-friendly user interface that allows a one-hand manipulation using a touch contact area or the like. Also, this user interface can offer, in response to the user's one-hand manipulations on the touch screen, a function to display a virtual pointer (also referred to as a pointer icon) such as a mouse pointer on the touch screen, a function to move the pointer, a function to execute a particular object selected by the pointer, and the like.

A user interface method and apparatus in accordance with this disclosure may be applied to various types of mobile devices such as a cellular phone, a smart phone, a tablet PC, a handheld PC, a PMP (portable multimedia player), a PDA (personal digital assistant), and the like.

Figure 1:
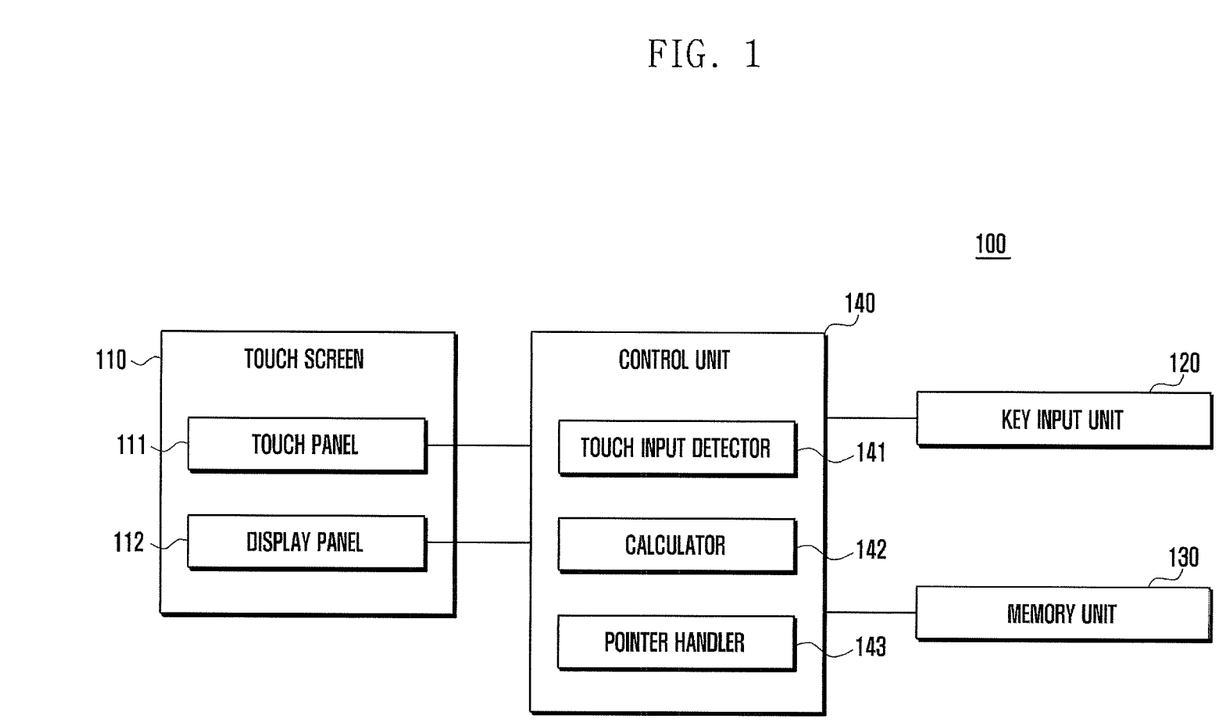
FIG. 1 illustrates a user interface apparatus in accordance with an embodiment of the present disclosure.

FIG. 1 is a block diagram illustrating a user interface apparatus in accordance with an embodiment of the present disclosure.

Referring to FIG. 1, the user interface apparatus, which is part of a mobile device 100, includes a touch screen 110, a key input unit 120, a memory unit 130, and a control unit 140. Although neither illustrated in the drawings nor described herein, the mobile device 100 may further essentially or optionally include an audio processing unit having a microphone and a speaker, a camera module for an image capture or preview, a short-range communication module for Bluetooth, infrared communication, and such, a wireless communication module for Internet and/or mobile communication, and the like.

The touch screen 110 may include a touch panel 111 and a display panel 112 which are used for a user interaction with the mobile device 100. The touch screen 110 may have an interface for supporting a touch-based input. Specifically, the touch panel 111 of the touch screen 110 may create a touch input signal in response to a user input (e.g., a touch) and deliver the signal to the control unit 140. Then the control unit 140 may detect the user's touch or touch gesture from the touch input signal and perform a particular function, corresponding to the detected touch or touch gesture, of the mobile device 100.

The touch panel 111 may be placed on the display unit 112 and have a touch sensor that detects a touched contact point and transmits a corresponding touch input signal to the control unit 140. The touch panel 111 may be disposed on the display panel 112 (i.e., referred to as an add-on type) or inserted in the display panel 112 (i.e., referred to as an on-cell type or in-cell type).

User gestures are classified as a touch or a touch gesture. In addition, a touch gesture may include a tap, a double tap, a long tap, a drag, a drag-and-drop, a flick, a press, and the like. A touch refers to user's action to make a touch input tool (e.g., a finger or a stylus pen) be in contact with any point on the screen. A tap refers to an action to touch any point on the screen and then release (namely, touch-off) a touch input tool from the touch point without moving the touch input tool. A double tap refers to an action to tap twice any point on the screen. A long tap refers to an action to touch relatively longer than a tap and then release a touch input tool from the touch point without moving the touch input tool. A drag refers to an action to move a touch input tool in an arbitrary direction while maintaining a touch on the screen. A drag-and-drop refers to an action to drag and then release a touch input tool from the screen. A flick refers to an action to move a touch input tool more quickly than a drag and then release the touch input tool. A press refers to an action to touch and push any point on the screen through a touch input tool. Namely, a touch means a state where any contact occurs on the touch screen 110, and a touch gesture means a movement of touch which continues from touch-on to touch-off. A multi touch means a state where any contact occurs simultaneously at two or more points on the touch screen. A multi touch gesture means a movement of multi touch which continues from touch-on to touch-off.

The touch panel 111 may be a capacitive type, a resistive type, an electromagnetic induction type, an infrared type, an ultrasonic type, or the like.

The display panel 112 displays a screen associated with an operating status of or a running function of the mobile device 100 under the control of the control unit 140. The display panel 112 may provide various screens according to use of the mobile device 100, e.g., a lock screen, a home screen, an application execution screen, a menu screen, a keypad screen, and the like. The lock screen refers to an initial screen displayed when the screen of the display panel 112 is turned on. If a specific touch event defined for unlock occurs, the control unit 140 may change a current display screen from the lock screen to the home screen, the application execution screen, or the like. The home screen refers to a screen in which many icons for executing applications or invoking functions of the mobile device 100 are arranged. When a user selects one of application execution icons displayed on the home screen, a selected application is executed under the control of the control unit 140, and the display panel 112 may display an execution screen of the selected application. The control unit 140 may execute a plurality of applications simultaneously. Although two or more applications are executed at the same time, the display panel 112 may display a single application execution screen under the control of the control unit 140. The display panel 112 may be formed of any planar display panel such as LCD (liquid crystal display), OLED (organic light emitting diodes), AMOLED (active matrix OLED), or any other equivalent.

Additionally, the display panel 112 may display a suitable screen for a display mode, namely, a landscape mode or a portrait mode, depending on a rotating direction or placed orientation of the mobile device 100.

The display panel 112 may display a pointer such as a mouse pointer on the screen under the control of the control unit 140. Further, such a pointer may be displayed in any input mode that allows a user to enter any input data or command.

According to embodiments of this disclosure, the display panel 112 may provide a pointer such as a mouse pointer or cursor in the form of arrow or in any other suitable form. Further, the display panel 112 may change a shape of a pointer depending on the attribute of object on which the pointer is placed. For example, if a pointer is placed on any object indicating a document, the pointer may have a hand-like shape. A pointer placed on any object indicating a graphic element may be shaped like a graphic editor tool such as a brush or a pencil. When disallowing a user input, a pointer may be shaped like a rotating circle that represents a waiting state. A pointer placed on the border of a window may be shaped like a bidirectional arrow that represents a resizable state. A pointer placed on an object having a hyperlink may be shaped like a finger.

The key input unit 120 may include a plurality of input keys and function keys to receive the user's input actions and to set up various functions. The function keys may have navigation keys, side keys, shortcut keys, and any other special keys defined to perform particular functions. Additionally, the key input unit 120 may receive the user's key manipulations for controlling a mobile device, create corresponding key input signals, and then deliver the signals to the control unit 140. Such key input signals may include power on/off signals, volume regulating signals, screen on/off signals, and the like. In response to the key input signals, the control unit 140 may control the above elements. When the mobile device supports the touch panel 111 in the form of a full touch screen, the key input unit 120 may have at least one side key, for power on/off or screen on/off, formed on any side of the device body.

The memory unit 130 stores an operating system (OS) of the mobile device 100, various applications, and various data. The memory unit 130 may include a data region and a program region. The data region of the memory unit 130 may store data created, updated, or downloaded in the mobile device 100 and attribute information of such data. Additionally, the data region may store the above-mentioned various screens to be displayed by the display panel 112. Also, the data region may temporarily store data copied for paste, and may store various setting values (e.g., screen brightness, etc.) associated with the operation of the mobile device.

The program region of the memory unit 130 may store an operating system (OS) for booting the mobile device 100, and various applications associated with a call function, a video, or music play function, an image display function, a camera function, a broadcast reception function, an audio recording function, a calculator function, a scheduler function, and the like.

The control unit 140 controls the overall operations of the mobile device, controls signal flows between elements of the mobile device, and processes data. In addition, the control unit 140 may control power supply from a battery to respective internal elements. Additionally, the control unit 140 may execute various kinds of applications stored in the program region. Particularly, when one of a touch, a touch gesture, a multi touch, and a multi touch gesture occurs, the control unit 140 may perform a particular corresponding function.

According to embodiments of this disclosure, by calculating a touch contact area or a touch pressure, the control unit 140 may distinguish between a small-sized touch by a finger tip and a large-sized touch by a finger flat (i.e., finger pad). When the occurrence of a finger flat touch is detected, the control unit 140 may control the touch screen 110 to display a pointer.

Specifically, the control unit 140 may include a touch input detector 141, a calculator 142, and a pointer handler 143.

The touch input detector 141 is connected to the touch screen 110 and detects a user's touch manipulation from the touch screen 110. Then the touch input detector 141 transmits a touch input signal corresponding to the detected touch manipulation to the calculator 142. The touch input detector 141 may detect touch coordinates, the type of a touch gesture, a moving direction and a moving distance of a touch, and the like. Particularly, the touch input detector 141 may detect locations of contact points associated with a touch. Namely, the touch input detector 141 may detect location coordinates of peripheral contact points from a touch contact region.

The calculator 142 may calculate a contact area of a touch region by using a signal received from the touch input detector 142. For example, the calculator 142 may calculate a contact area from a geometrical figure formed by connecting location coordinates of peripheral contact points in a touch contact region. Also, the calculator 142 may calculate a touch pressure (e.g., the magnitude of capacitance) of a touch region by using a signal received from the touch input detector 142.

Additionally, the calculator 142 may calculate distances from a touch contact region to executable objects displayed on the screen. In this disclosure, an executable object refers to a particular object, such as an application executable icon or any executable item having a hyperlink, which can be executed in response to a specific command.

Specifically, the calculator 142 may identify executable objects among all objects displayed on the screen. The calculator 142 may calculate central coordinates of each identified object and a distance from central coordinates of each identified object to those of a touch region. The calculator 142 may transmit to the pointer handler 143 calculation results associated with a touch contact area and a distance.

The pointer handler 143 may determine whether a touch contact area exceeds a predetermined area or whether a touch pressure exceeds a predetermined pressure. If a touch contact area exceeds a predetermined area or if a touch pressure exceeds a predetermined pressure, the pointer handler 143 may further determine whether a touch contact time exceeds a predetermined time. Such predetermined area, pressure, and time may be defined by a user or at the time of manufacture of a mobile device.

In embodiments of this disclosure, the pointer handler 143 may display a pointer on the touch screen 110 when satisfying at least one of condition that a touch contact area exceeds a predetermined area, condition that a touch contact time exceeds a predetermined time, and condition that a touch pressure exceeds a predetermined pressure. Also, the pointer handler 143 may combine or not combine conditions associated with a touch contact area and a touch contact time so as to distinguish it from other touch gestures.

In embodiments of this disclosure, the pointer handler 143 may display a pointer on the touch screen 110 when a touch contact area exceeds a predetermined area. Also, while a pointer is displayed on the touch screen 110, the pointer handler 143 may detect a touch movement and then control the movement of the pointer in response to the touch movement.

In embodiments of this disclosure, the pointer handler 143 may determine whether a specific condition is satisfied while a pointer is displayed. If a touch movement is stopped or if any other condition of variations in a touch contact area is satisfied, the pointer handler 143 may measure again a touch contact area. If a touch contact area exceeds a predetermined area with a touch being maintained on the touch screen 110, the pointer handler 143 may perform a function to select an object indicated by the pointer.

In embodiments of this disclosure, the pointer handler 143 may select the most distant object on the basis of distances between a touch contact region and objects calculated by the calculator 142, and then display a pointer at a specific location corresponding to the selected object.

For example, the touch screen 110 may display a webpage screen under the control of the control unit 140. In this case, the webpage screen offers a webpage address window, a personal information input window, various texts with hyperlinks, and the like, which may be considered as executable objects in this disclosure. While the webpage screen is displayed, a user can touch the touch screen 110 with the flat of his or her finger or thumb. Then the control unit 140 may calculate a touch contact area and a touch contact time and determine whether the touch contact area and the touch contact time exceed a predefined area and time respectively. If so, the control unit 140 may control a pointer to be displayed on the most distant object among executable objects arranged in the webpage screen. For example, if an address window is the most distant object from a touch contact region in the webpage screen, a pointer is displayed on the address window under the control of the control unit 140.

Additionally, while a pointer is displayed on the touch screen 110, a user can move the pointer by moving his or her thumb. Also, a user can touch again the touch screen 110 with the flat of his or her thumb without removing a touch. Then the control unit 140 may execute a specific application icon indicated by the pointer or enter into an input mode by displaying an input cursor in an input window.

Further, the apparatus according to some embodiment of this disclosure may provide an option item for determining, depending on user's selection, whether to display a pointer by using a touch contact area.

The above-discussed operation of the control unit 140 will become clearer from a more detailed description given below. The control unit 140 may control various touch-based normal functions in addition to the above-mentioned functions.

The mobile device 100 may essentially or selectively further include any other elements such as a sensor module for detecting information related to location variations of the mobile device, a GPS module for measuring the location of the mobile device, a camera module, and the like. As will be understood by those skilled in the art, some of the above-mentioned elements in the mobile device may be omitted or replaced with another. In addition to the touch screen 110 and the key input unit 120, the mobile device of this disclosure may further include a touch pad, a trackball, and the like, as an input unit.

Figure 2:
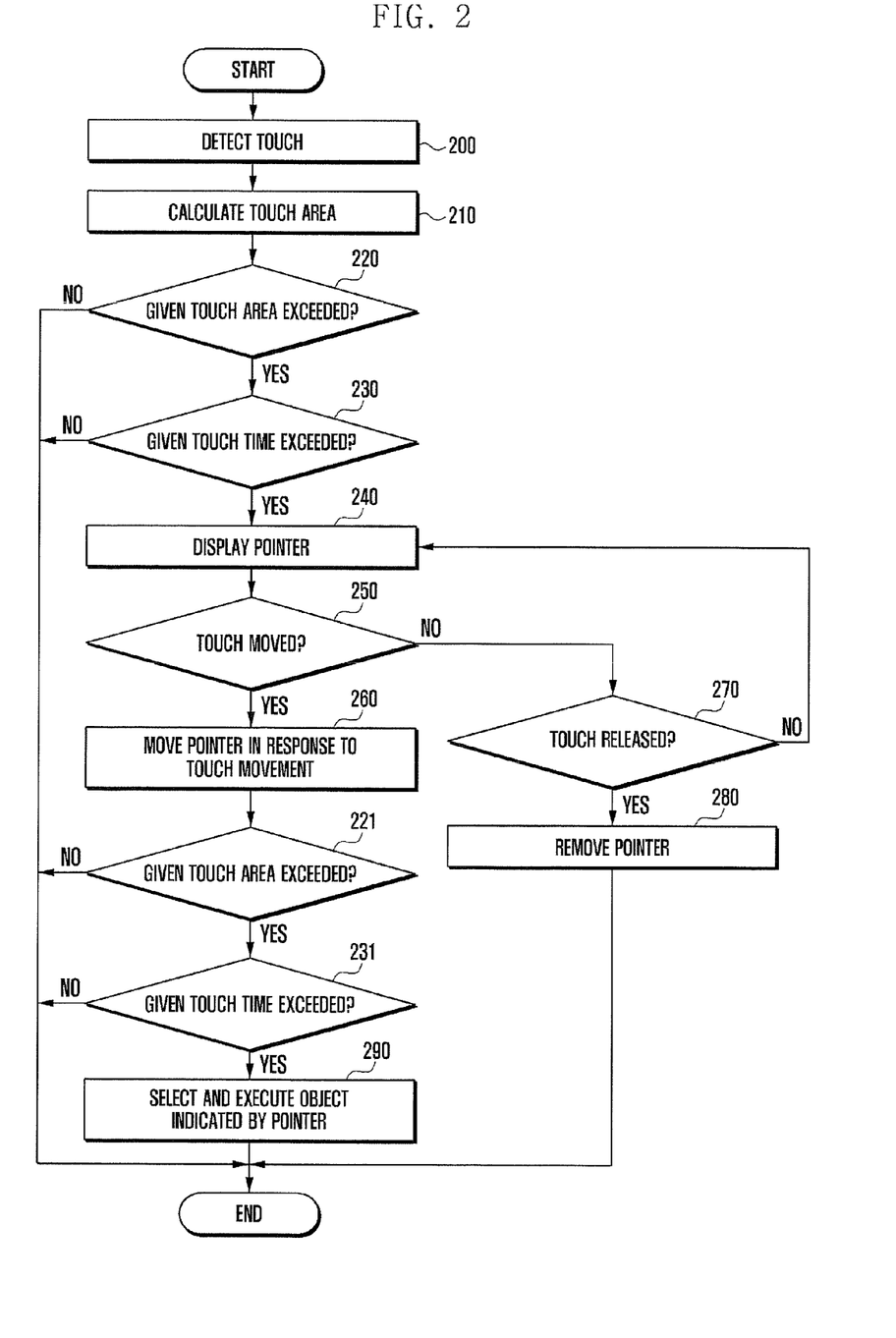
FIG. 2 illustrates a user interface method allowing a one-hand manipulation of a mobile device in accordance with an embodiment of the present disclosure.

FIG. 2 is a flow diagram illustrating a user interface method allowing a one-hand manipulation of a mobile device in accordance with an embodiment of the present disclosure.

Referring to FIG. 2, at operation 200, the control unit 140 detects a user's touch from the touch screen 110. Then, at operation 210, the control unit 140 obtains a touch location and a touch contact area from the detected touch. Specifically, using a touch input signal received from the touch screen 110, the control unit 140 may calculate the area of a touch region from peripheral coordinates thereof and also calculate the location of a touch region.

At operation 220, the control unit 140 determines whether a touch contact area exceeds a predetermined area. This predetermined area refers to a specific area of a touch region defined for a pointer display function, and may be defined by a user or at the manufacture of a mobile device. If a touch contact area does not exceed a predetermined area, a process may be terminated.

If the touch contact area exceeds a predetermined area, the control unit 140 further determines at operation 230 whether a touch contact time exceeds a predetermined time. This predetermined time refers to a specific time of a touch contact defined for a pointer display function so as to distinguish it from touch gestures for the other functions. The predetermined time may be defined by a user or at the time of manufacture of the mobile device. If a touch contact time does not exceed a predetermined time, the control unit 140 may terminate a process. In some embodiments, operation 230 may be omitted from the process. In this case, the control unit 140 proceeds with operation 240 when a touch contact area exceeds a predetermined area at operation 220.

If a touch contact area exceeds a predetermined area and a touch contact time exceeds a predetermined time, at operation 240 a pointer is displayed on the touch screen 110 under the control of the control unit 140. Namely, the control unit 140 may identify executable objects arranged on the screen, select one of the identified objects, and place a pointer on the selected object.

While a touch contact is maintained on the touch screen 110, the control unit 140 detects a touch movement at operation 250. This detection may be carried out regardless of a touch contact area. If any touch movement is detected, at operation 260 the control unit 140 moves a pointer displayed on the screen in response to the detected touch movement.

If no touch movement is detected at operation 250, at operation 270 the control unit 140 checks whether a touch release occurs. A touch release refers to a state where a touch contact is removed from the touch screen 110. If a touch release occurs, at operation 280 the control unit 140 removes the displayed pointer from the touch screen 110.

When a touch movement is stopped or a touch contact area is varied, the control unit 140 determines again at operation 221 whether a touch contact area exceeds a predetermined area. If a touch contact area does not exceed a predetermined area, a process may be terminated.

If a touch contact area exceeds a predetermined area, the control unit 140 determines again at operation 231 whether a touch contact time exceeds a predetermined time. If a touch contact time does not exceed a predetermined time, the control unit 140 may terminate a process. In some embodiments, operation 231 may be omitted from the process. In this case, the control unit 140 proceeds with operation 290 when a touch contact area exceeds a predetermined area at operation 221.

If a touch contact time exceeds a predetermined time, at operation 290 the control unit 140 performs a function to select one of multiple executable objects through a pointer. For example, when a home screen is displayed on the touch screen 110, the control unit 140 may select any application trigger icon displayed on the home screen by means of a pointer and then execute the selected application by means of a pointer. In another example, when a webpage screen is displayed on the touch screen 110, the control unit 140 may select an address input window by means of a pointer and then enter into an input mode.

Figure 3:
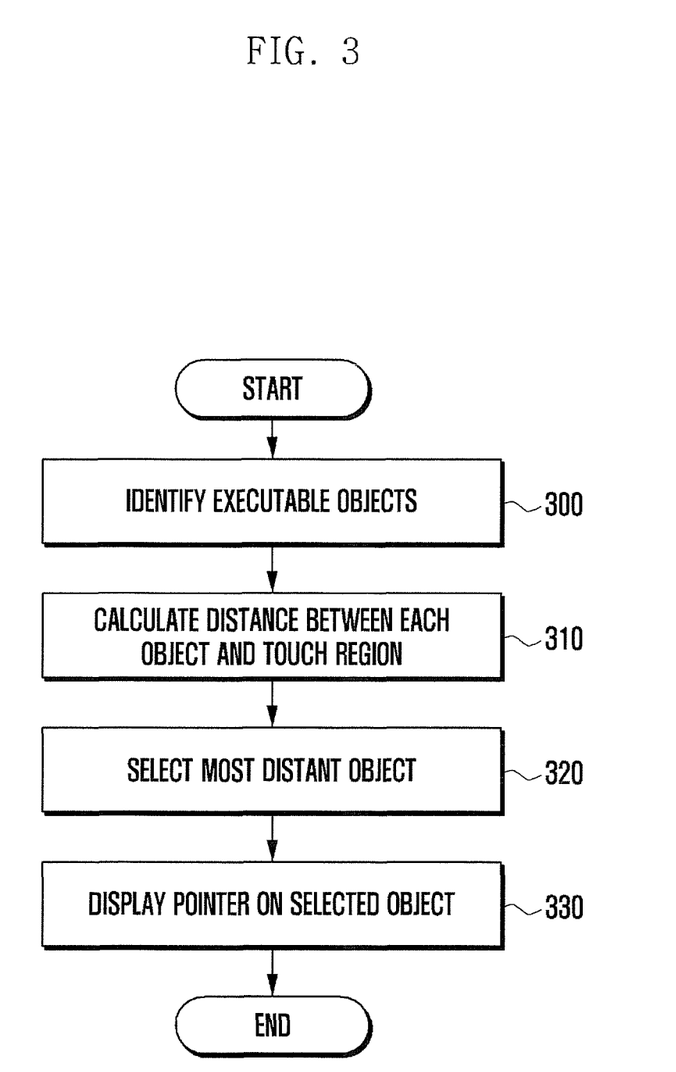
FIG. 3 illustrates a function to control a pointer in accordance with an embodiment of the present disclosure.

FIG. 3 is a flow diagram illustrating a function to control a pointer in accordance with an embodiment of the present disclosure. Particularly, FIG. 3 shows operations of determining the location of a pointer in a process of displaying the pointer on the touch screen.

Referring to FIG. 3, at operation 300, the control unit 140 identifies executable objects in the screen displayed on the touch screen 110. Then, at operation 310, the control unit 140 calculates central coordinates of each identified object and also calculates a distance from the central coordinates of each identified object to those of a touch region. At operation 320, the control unit 140 selects the most distant object from the touch region, based on the calculated distances. At operation 330, the control unit 140 displays a pointer at a specific location corresponding to the coordinates of the selected object.

Although in this embodiment the most distant object from a touch region is selected to display a pointer, this is exemplary only and not to be considered as a limitation of the present disclosure. Alternatively, a user can define priorities of objects to be selected.

Now, a one-hand manipulable user interface will be described.

Figure 4:
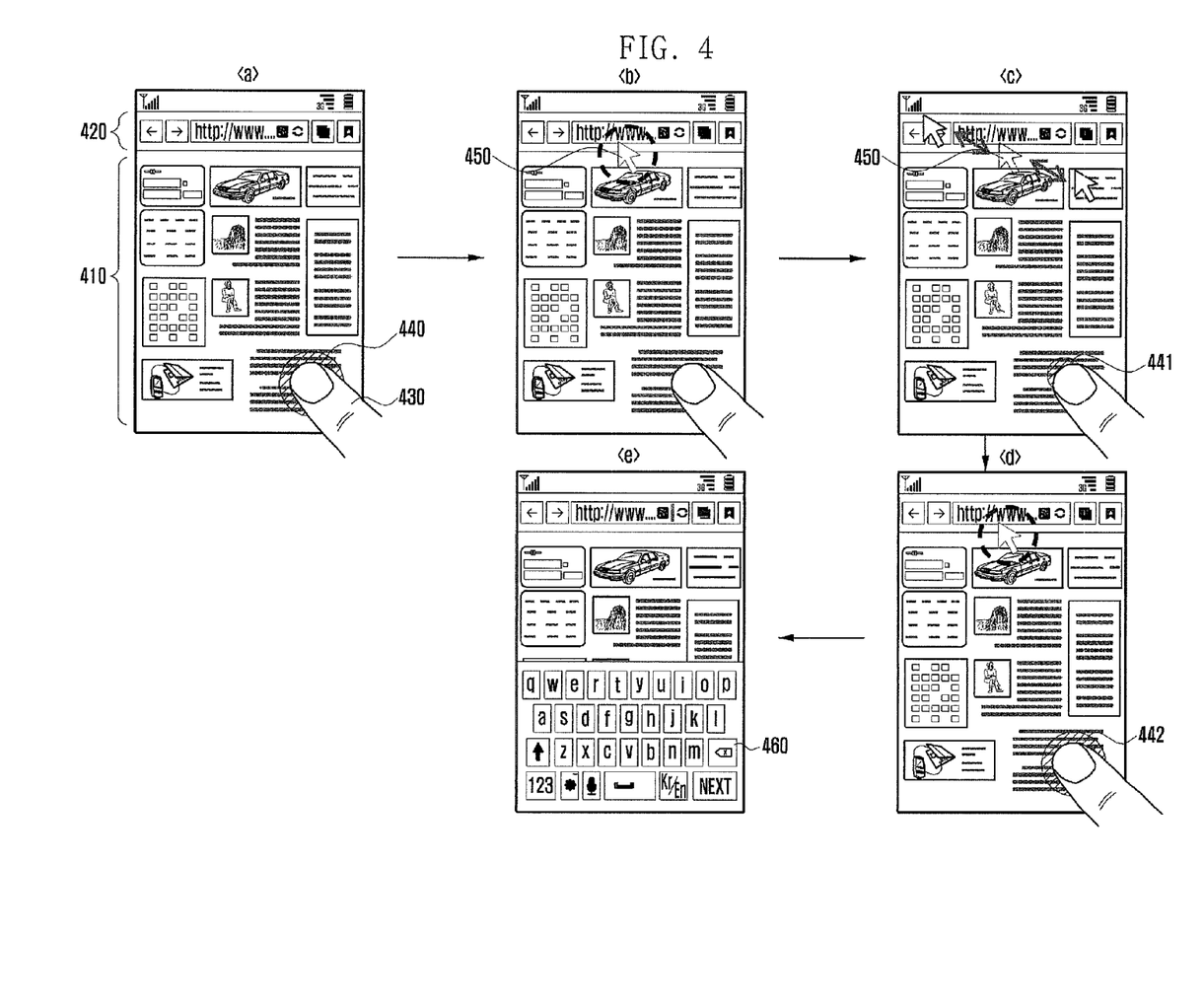
FIG. 4 shows screenshots of a one-hand manipulable user interface in accordance with an embodiment of the present disclosure.

FIG. 4 shows screenshots of a one-hand manipulable user interface in accordance with an embodiment of the present disclosure.

Referring to FIG. 4, the touch screen 110 displays a selected screen such as a home screen, an application screen, a web browser screen, or the like under the control of the control unit 140. Hereinafter, it is supposed that a web browser screen is displayed on the touch screen 110.

As seen from screenshot <a> in FIG. 4, the touch screen 110 displays a web browser screen under the control of the control unit 140. This web browser screen is divided into a display section 410 in which a webpage is displayed, and a function section 420 in which various function keys are offered. The function section 420 may contain an address window object for showing or inputting an address, a switch key object for switching to a previous or next stage, a favorite registration key for registering a favorite web site, and the like. The display section 410 may contain an image object, a text object, a personal information input window for inputting ID and password, and the like.

When a web browser screen is displayed, a user can touch the touch screen 110 with the flat 440 of his or her finger 430 or thumb. By touching the screen with a finger flat rather than a finger tip, a contact area of a touch region becomes greater.

The touch screen 110 transmits to the control unit 140 a touch input signal including location information about peripheral points of a touch contact region. Then the control unit 140 may calculate the area and location of the touch contact region from the location information in the received touch input signal.

If it is determined that the area and time of user's touch with the finger flat exceed a predetermined area and time, the touch screen 110 displays a pointer 450 on the web browser screen under the control of the control unit 140 as seen from screenshot <b> in FIG. 4. As earlier discussed in FIG. 3, this pointer 450 may be preferentially placed on the most distant object among executable objects. In some embodiments, the pointer may be displayed on condition that a touch contact area exceeds a predetermined area or a touch contact time exceeds a predetermined time.

In this state, a user can move a touching finger on the touch screen 110. Namely, as seen from screenshot <c> in FIG. 4, a user may change the location of a touch contact region by moving (e.g., dragging) his or her finger tip 441 or flat. Then the touch screen 110 changes the location of the pointer 450 in response to user's finger movement. This change of a pointer location may be made regardless of a touch contact area.

Thereafter, as seen from screenshot <d> in FIG. 4, a user can touch again the touch screen 110 with a finger flat 442. If the area and time of this touch exceed a predetermined area and time, the control unit 140 performs a function to select a specific object (e.g., an address window) on which the pointer 450 is placed. This selection function may be performed on condition that a touch contact area exceeds a predetermined area or a touch contact time exceeds a predetermined time.

Then the touch screen 110 enters into a specific mode associated with the selected object (e.g., a text input mode in an address window) under the control of the control unit 140. Additionally, in the above example, the touch screen 110 may display an input cursor in an address window and further display a keypad window 460 under the control of the control unit 140 as seen from screenshot <e> in FIG. 4.

Figure 5:
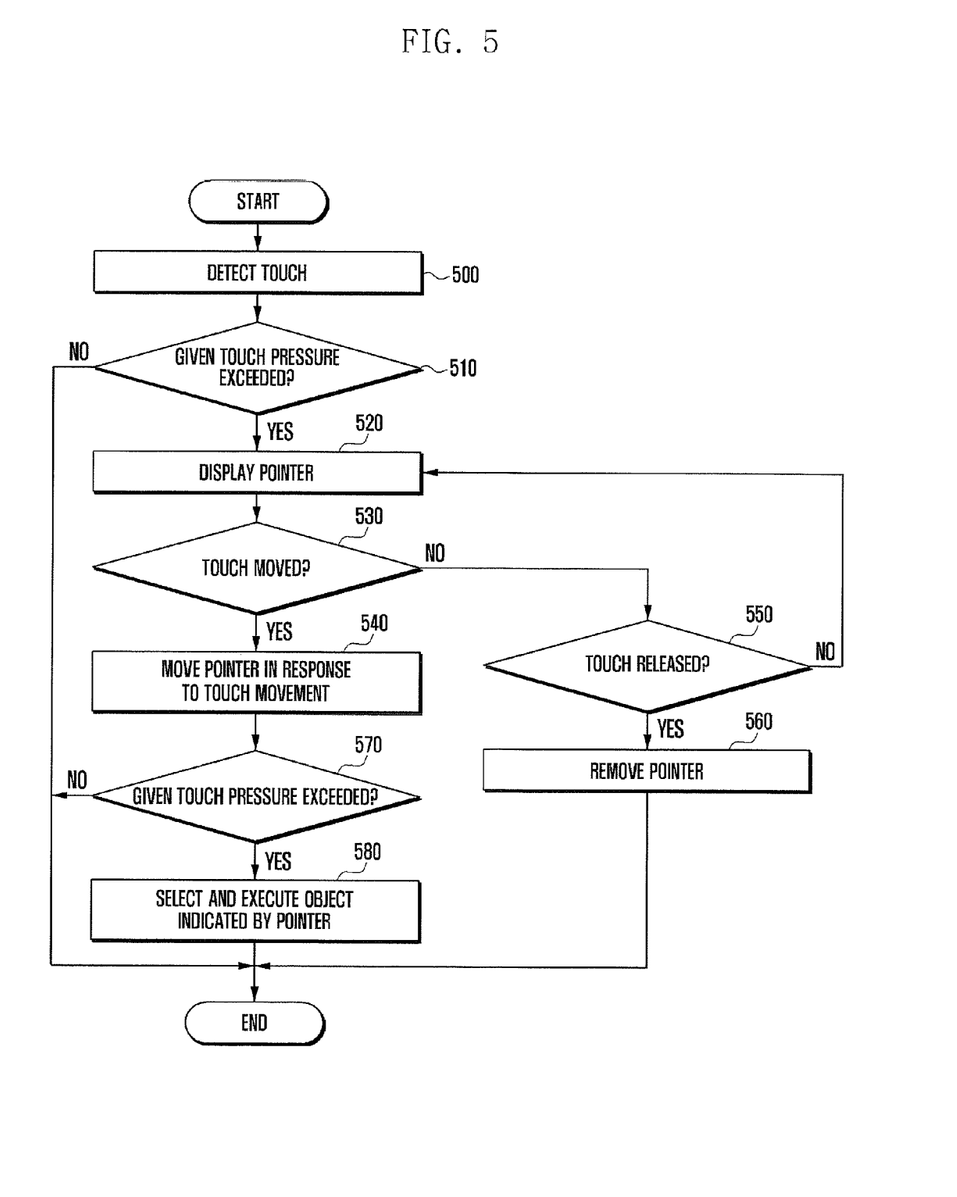
FIG. 5 illustrates a user interface method allowing a one-hand manipulation of a mobile device in accordance with another embodiment of the present disclosure.

FIG. 5 is a flow diagram illustrating a user interface method allowing a one-hand manipulation of a mobile device in accordance with another embodiment of the present disclosure.

Referring to FIG. 5, at operation 500, the control unit 140 detects a user's touch from the touch screen 110 that displays one of various screens. Then, at operation 510, the control unit 140 determines whether the pressure of the detected touch exceeds a predetermined pressure. This predetermined pressure refers to a specific touch pressure defined for a pointer display function so as to distinguish it from touch gestures for the other functions. The predetermined pressure may be defined by a user or at the time of manufacture of the mobile device. If the touch pressure does not exceed the predetermined pressure, the control unit 140 may terminate the process.

If the touch pressure exceeds the predetermined pressure, at operation 520 a pointer is displayed on the touch screen 110 under the control of the control unit 140. Namely, the control unit 140 may identify executable objects arranged on the screen, select one of the identified objects, and place a pointer on the selected object.

While a touch contact is maintained on the touch screen 110, the control unit 140 detects a touch movement at operation 530. The detected touch movement may have a pressure smaller than the above predetermined pressure. If any touch movement is detected, at operation 540 the control unit 140 moves a pointer displayed on the screen in response to the detected touch movement. If no touch movement is detected at operation 530, at operation 550 the control unit 140 checks whether a touch release occurs. A touch release refers to a state where a touch contact is removed from the touch screen 110. If a touch release occurs, at operation 560 the control unit 140 removes the displayed pointer from the touch screen 110.

When a touch movement is stopped or a touch contact area is varied, the control unit 140 determines again at operation 570 whether a touch pressure exceeds a predetermined pressure. If the touch pressure does not exceed the predetermined pressure, the process may be terminated.

If the touch pressure exceeds the predetermined pressure, at operation 580 the control unit 140 performs a function to select one of executable objects through a pointer.

Figure 6:
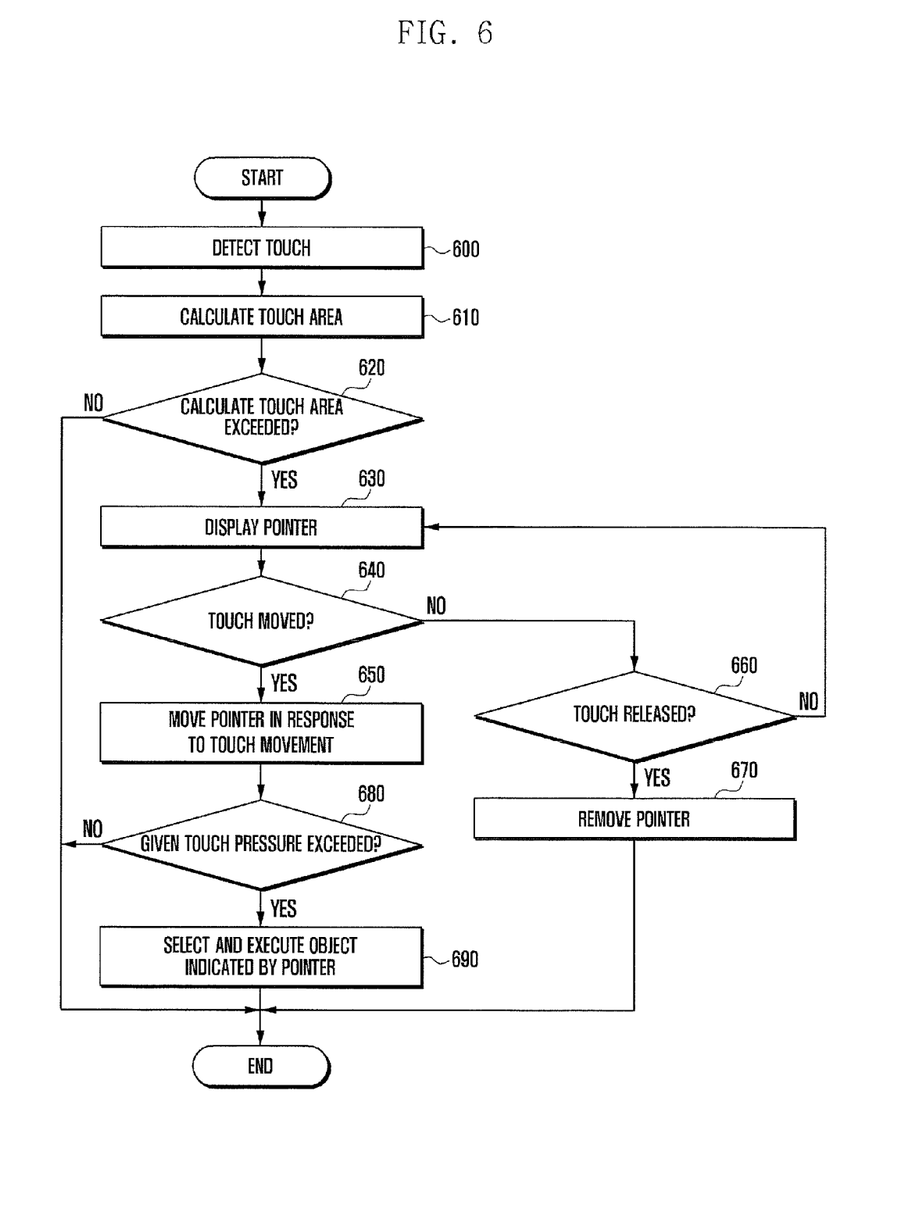
FIG. 6 illustrates a user interface method allowing a one-hand manipulation of a mobile device in accordance with still another embodiment of the present disclosure.

FIG. 6 is a flow diagram illustrating a user interface method allowing a one-hand manipulation of a mobile device in accordance with still another embodiment of the present disclosure.

Referring to FIG. 6, at operation 600, the control unit 140 detects a user's touch from the touch screen 110. Then, at operation 610, the control unit 140 obtains a touch location and a touch contact area from the detected touch. Specifically, using a touch input signal received from the touch screen 110, the control unit 140 may calculate the area of a touch region from peripheral coordinates thereof and also calculate the location of the touch region.

At operation 620, the control unit 140 determines whether the touch contact area exceeds a predetermined area. This predetermined area refers to a specific area of a touch region defined for a pointer display function so as to distinguish it from touch gestures for the other functions. The predetermined area may be defined by a user or at the time of manufacture of the mobile device. If the touch contact area does not exceed the predetermined area, the process may be terminated.

If the touch contact area exceeds the predetermined area, at operation 630 a pointer is displayed on the touch screen 110 under the control of the control unit 140. Namely, the control unit 140 may identify executable objects arranged on the screen, select one of the identified objects, and place a pointer on the selected object.

While a touch contact is maintained on the touch screen 110, the control unit 140 detects a touch movement at operation 640. If any touch movement is detected, at operation 650 the control unit 140 moves a pointer displayed on the screen in response to the detected touch movement. If no touch movement is detected at operation 640, at operation 660 the control unit 140 checks whether a touch release occurs. A touch release refers to a state where a touch contact is removed from the touch screen 110. If a touch release occurs, at operation 670 the control unit 140 removes the displayed pointer from the touch screen 110.

When a touch movement is stopped or a touch contact area is varied, the control unit 140 determines at operation 680 whether a touch pressure exceeds a predetermined pressure. This predetermined pressure refers to a specific touch pressure defined for a pointer display function so as to distinguish it from touch gestures for the other functions. The predetermined pressure may be defined by a user or at the time of manufacture of the mobile device. If the touch pressure does not exceed the predetermined pressure, the control unit 140 may terminate the process.

If the touch pressure exceeds the predetermined pressure, at operation 690 the control unit 140 performs a function to select one of executable objects through a pointer.

As fully discussed hereinbefore, in the mobile device having the touch screen, a user interface allows a one-hand manipulation to perform a selected function by using at least one of a touch contact area, a touch contact time, and a touch pressure. Also, this user interface improves user friendliness by displaying a virtual pointer such as a mouse pointer on the touch screen, moving the pointer, and executing a particular object selected by the pointer in response to user's one-hand manipulations. Namely, this disclosure provides a user-friendly, one-hand controllable user interface for a mobile device having a large screen.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing a user interface in a mobile device having a touch screen, the method comprising:
   detecting a touched region from the touch screen;
   determining whether the detected touch region satisfies at least one of a first condition of exceeding a predetermined area, a second condition of exceeding a predetermined time, and a third condition of exceeding a predetermined pressure;
   generating and displaying a pointer at a specific location of the touch screen when the detected touch satisfies at least one of the first, second and third conditions;
   detecting a movement of the touch on the touch screen; moving the pointer in response to the movement of the touch region; and
   removing the pointer when the touch is released,
   wherein the displaying of the pointer includes:
      identifying executable objects arranged in the touch screen;
      calculating a distance from the touch region to each executable object;
      selecting the most distant object from the touch region among the executable objects; and
      displaying the pointer on the selected objects.

2. The method of claim 1, wherein the detecting of the touch region includes:
   receiving coordinates of the touch region from the touch screen; and
   calculating a touch contact area from a geometrical figure formed by connecting location coordinates of peripheral contact points in the touch region.

3. The method of claim 1, wherein the displaying of the pointer includes:
   selecting one of a plurality of executable objects arranged in a specific screen displayed on the touch screen; and
   placing the pointer on the selected object.

4. The method of claim 1, wherein the calculating of the distance includes calculating a distance between central coordinates of each object and central coordinates of the touch region.

5. The method of claim 1, further comprising:
   after the detecting of the movement of the touch region, removing the pointer from the touch screen when a touch release occurs.

6. The method of claim 1, further comprising:
after the detecting of the movement of the touch region, checking whether a precondition is satisfied while the pointer is displayed;
if the precondition is satisfied, determining again whether the touch region satisfies at least one of the first, second and third conditions; and
selecting and executing an object arranged at the location of the pointer displayed on the touch screen when the touch region satisfies at least one of the first, second and third conditions.

7. The method of claim 6, wherein the precondition comprises a touch movement is stopped or a touch contact area is varied.

8. The method of claim 6, wherein the determining again includes determining whether a contact area of the touch region exceeds a predetermined area, and further determining whether a contact time of the touch region having the contact area exceeding the predetermined area exceeds a predetermined time, and
wherein the selecting and executing of the object includes selecting and executing the object when the contact time of the touch region exceeds the predetermined time.

9. The method of claim 6, wherein the determining again includes determining whether a pressure of the touch region exceeds a predetermined pressure, and further determining whether a contact time of the touch region having the pressure exceeding the predetermined pressure exceeds a predetermined time, and
wherein the selecting and executing of the object includes selecting and executing the object when the contact time of the touch region exceeds the predetermined time.

10. An apparatus for providing a user interface in a mobile device, the apparatus comprising:
a touch screen configured to display a specific screen; and
a control unit configured to:
detect a touched region from the touch screen;
determine whether the detected touch region satisfies at least one of a first condition of exceeding a predetermined area, a second condition of exceeding a predetermined time, and a third condition of exceeding a predetermined pressure;
control the touch screen to generate a pointer and to display the generated pointer at a specific location when the detected touch region satisfies at least one of the first, second and third conditions;
detect a movement of the touch on the touch screen; move the pointer in response to the movement of the touch region; and
remove the pointer when the touch is released,
wherein the control unit is further configured to:
identify executable objects arranged in the touch screen,
calculate a distance from the touch region to each executable object,
select the most distant object from the touch region among the executable objects, and
display the pointer on the selected object.

11. The apparatus of claim 10, wherein the control unit is further configured to determine whether a contact time of the touch region having a contact area exceeding the predetermined area exceeds the predetermined time, and display the pointer when the contact time exceeds the predetermined time.

12. The apparatus of claim 10, wherein the control unit is further configured to calculate a touch contact area from a geometrical figure formed by connecting location coordinates of peripheral contact points in the touch region.

13. The apparatus of claim 10, wherein the control unit is further configured to select one of a plurality of executable objects arranged in the specific screen displayed on the touch screen, and place the pointer on the selected object.

14. The apparatus of claim 10, wherein the control unit is further configured to remove the pointer from the touch screen when a touch release occurs.

15. The apparatus of claim 10, wherein the control unit is further configured to select and execute an object arranged at the location of the pointer displayed on the touch screen when a specific precondition is satisfied while the pointer is displayed, and when the touch region satisfies at least one of the first, second and third conditions.

16. The apparatus of claim 15, wherein the precondition comprises a touch movement is stopped or a touch contact area is varied.

17. The apparatus of claim 15, wherein the control unit is further configured to, if a contact area of the touch region exceeds a predetermined area, determine whether a contact time of the touch region exceeds a predetermined time, wherein the control unit selects and executes the object by selecting and executing the object when the contact time of the touch region exceeds the predetermined time.

18. The apparatus of claim 15, wherein the control unit is further configured to, if a pressure of the touch region exceeds a predetermined pressure, determine whether a contact time of the touch region exceeds a predetermined time, wherein the control unit selects and executes the object by selecting and executing the object when the contact time of the touch region exceeds the predetermined time.

* * * * *